(12) United States Patent
Engstrom et al.

(10) Patent No.: US 7,274,680 B2
(45) Date of Patent: Sep. 25, 2007

(54) COMBINED MOBILE COMMUNICATION PLUS POINTING DEVICE

(75) Inventors: G. Eric Engstrom, Kirkland, WA (US); Peter Zatloukal, Kirkland, WA (US)

(73) Assignee: Wildseed Ltd., Seattle, WA (US)

( * ) Notice: Subject to any disclaimer, the term of this patent is extended or adjusted under 35 U.S.C. 154(b) by 533 days.

(21) Appl. No.: 10/503,006

(22) PCT Filed: Apr. 1, 2004

(86) PCT No.: PCT/US2004/010067

§ 371 (c)(1), (2), (4) Date: Jul. 29, 2004

(87) PCT Pub. No.: WO2004/090664

PCT Pub. Date: Oct. 21, 2004

(65) Prior Publication Data

US 2005/0220067 A1    Oct. 6, 2005

(51) Int. Cl.
*H04J 1/00* (2006.01)
(52) U.S. Cl. ............... 370/343; 455/550; 455/556; 345/156; 345/173
(58) Field of Classification Search ......... 300/343; 305/14; 345/156, 123; 455/550, 566
See application file for complete search history.

(56) References Cited

U.S. PATENT DOCUMENTS 6,587,835 B1 *  7/2003  Treyz et al. ............... 705/14
2001/0041598 A1  11/2001  Yoshino et al.
2004/0121800 A1   6/2004  Nagata
2004/0155860 A1 *  8/2004  Wenstrand et al. ......... 345/156
2004/0204140 A1  10/2004  Nagata
2004/0263485 A1 * 12/2004  Ho et al. .................. 345/173

* cited by examiner

*Primary Examiner*—Joseph Feild
*Assistant Examiner*—David Q. Nguyen
(74) *Attorney, Agent, or Firm*—Schwabe, Williamson & Wyatt, P.C.

(57) ABSTRACT

A mobile device is equipped with components to facilitate communication with another user, as well as controlling pointing on a computing device proximally disposed adjacent to the mobile device. The communication may be audio or textual. The mobile device includes a movement mechanism to generate movement signals, which are processed into pointing control signals and transmitted to the proximally disposed computing device. The movement mechanism may be an electro-mechanical mechanism, an optical-electro-mechanical mechanism, or an optical mechanism, integrated with the device, or disposed on an interchangeable cover removably mated with a core body of the mobile device. The pointing control signals may be transmitted as radio frequency signal employing a radio frequency signal transmitter, or infrared signal employing an infrared signal transmitter. Similarly, the transmitter may be disposed on an interchangeable cover removably mated with a core body of the mobile device.

14 Claims, 10 Drawing Sheets

COMBINED MOBILE COMMUNICATION PLUS POINTING DEVICE

RELATED APPLICATION

This application is the non-provisional application of provisional application 60/459,874, filed on Apr. 1, 2003, having the same title, and claims priority to said '874 provisional application.

For the United States, this application is also a continuation-in-part application, claiming priority to:

(a) U.S. patent application Ser. No. 10/087,098, filed Mar. 1, 2002, entitled "PERSONALIZING ELECTRONIC DEVICES AND SMART COVERING", which itself claims priority to its provisional filing No. 60/306,326, filed on Jul. 17, 2001;

(b) U.S. patent application Ser. No. 09/932,154, filed Aug. 17, 2001, entitled "MOBILE ELECTRONIC DEVICE AND COVERING FOR SIMILAR DEVICES WITH ORNAMENT ATTACHMENT MECHANISM", which itself claims priority to its provisional filing No. 60/292,123, filed on May 17, 2001; and (c) U.S. patent application Ser. No. 10/301,431, filed Nov. 20, 2002, entitled "Adding Control Keys to a Wireless Mobile Communication Device", which itself claims priority to its provisional filing No. 60/418,925, filed on Oct. 15, 2002.

FIELD OF THE INVENTION

The present invention relates to the field of mobile communication devices and pointing control devices. More specifically, the present invention is related to a mobile communication device, such as a wireless mobile phone, a personal digital assistant (PDA) and so forth, that can double as a pointing control device for a proximally disposed computing device.

BACKGROUND OF THE INVENTION

Advances in microprocessor technology in past years have led to wide spread deployment and adoption of personal computers and graphical user interfaces for software. Most graphical user interfaces employ a point-and-click model for user interaction, especially for list items selection. Resultantly, pointing devices, such as mice, track balls, touch pads, and so forth, have become an integral part of modern day computing, with the mouse being by far the most popular and widely deployed pointing devices.

As technology continues to advance, mobile computing, such as portable computers, also referred to as laptop computers, have also become widely deployed and adopted. While most portable/laptop computers come with integrated touch pads or track points, many users still prefer the use of a mouse as a pointing device instead. Typically, the mouse is attached to a portable/laptop computer as an external input/output (I/O) peripheral, via a serial port, a PS/2 mouse port, or a Universal Serial Bus (USB) port.

Recent advances in networking and telecommunication technology have led to wide spread deployment and adoption of mobile devices, such as wireless mobile phones and PDA. Resultantly, for mobile computing users who continue to prefer to use a mouse as the pointing device, it is necessary to "travel" with the wireless mobile communication device, the laptop computer, and the extra mouse.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention, a combined mobile communication plus pointing device, includes in particular, a combined mobile phone plus point device.

Parts of the description will be presented in terms, such as mobile communication devices, wireless mobile phones, interchangeable covers, and so forth, consistent with the manner commonly employed by those skilled in the art to convey the substance of their work to others skilled in the art.

As well understood by those skilled in the art, the term "mobile communication device" as used herein (hereafter, simply "mobile device"), including in the claims, comprise wireless mobile phones, PDA, and other devices of the like.

The term "wireless mobile phone" as used herein (in the specification and in the claims) refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

The term "cover" as used herein refers to a part that inherently includes multiple surfaces that cover at least multiple ones of the exterior surfaces of the body or core unit of a mobile device, where the exterior surfaces are inherently disposed in different geometric planes. Accordingly, while a "cover" may come in many variants, as illustrated by the description to follow, a "card" like part, i.e. a part having the form factor of a "credit card", a PCMCIA card, a PC card, a Compact Flash card and so forth, is not a "cover", for the purpose of the present application. A "card" like part, for the purpose of the present application, by definition, is considered to occupy only one geometric plane. [PCMCIA=Personal Computer Memory Card International Association]

In the following description, various aspects of the present invention will be described. However, it will be apparent to those skilled in the art that the present invention may be practiced with only some or all aspects of the present invention.

In particular, while the present invention will be primarily described with embodiments of a combined wireless phone plus pointing device, the present invention is not so limited. The present invention includes other embodiments, endowing other forms of mobile communication devices with remote pointing functionalities.

For purposes of explanation, specific numbers, materials and configurations are set forth in order to provide a thorough understanding of the present invention. However, it will be,apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

The terms "comprising", "having" and "including" are synonymous, unless the context dictates otherwise.

Figure 1A:
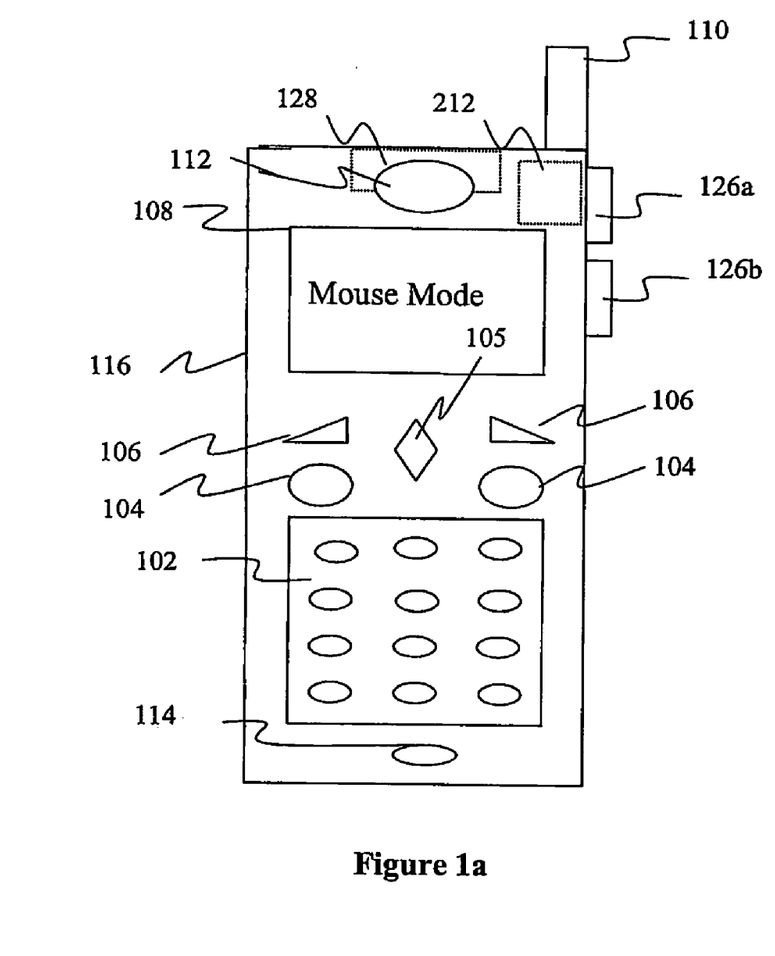
FIGS. 1a-1b illustrate a front view and a side view of the combined mobile communication plus pointing device of the present invention, in accordance with one embodiment.
Figure 1B:
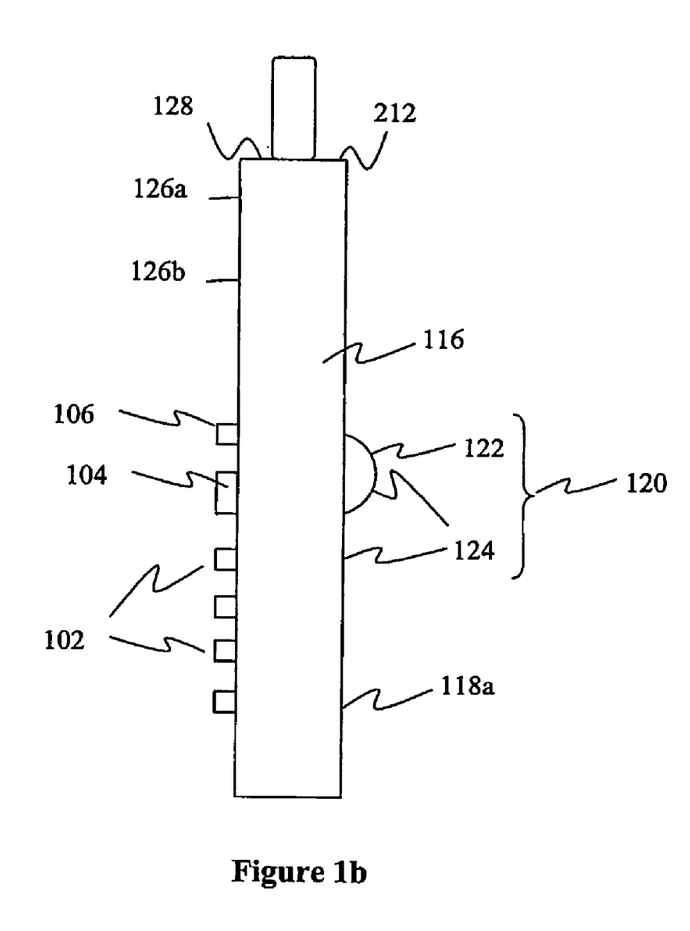
Figure 2:
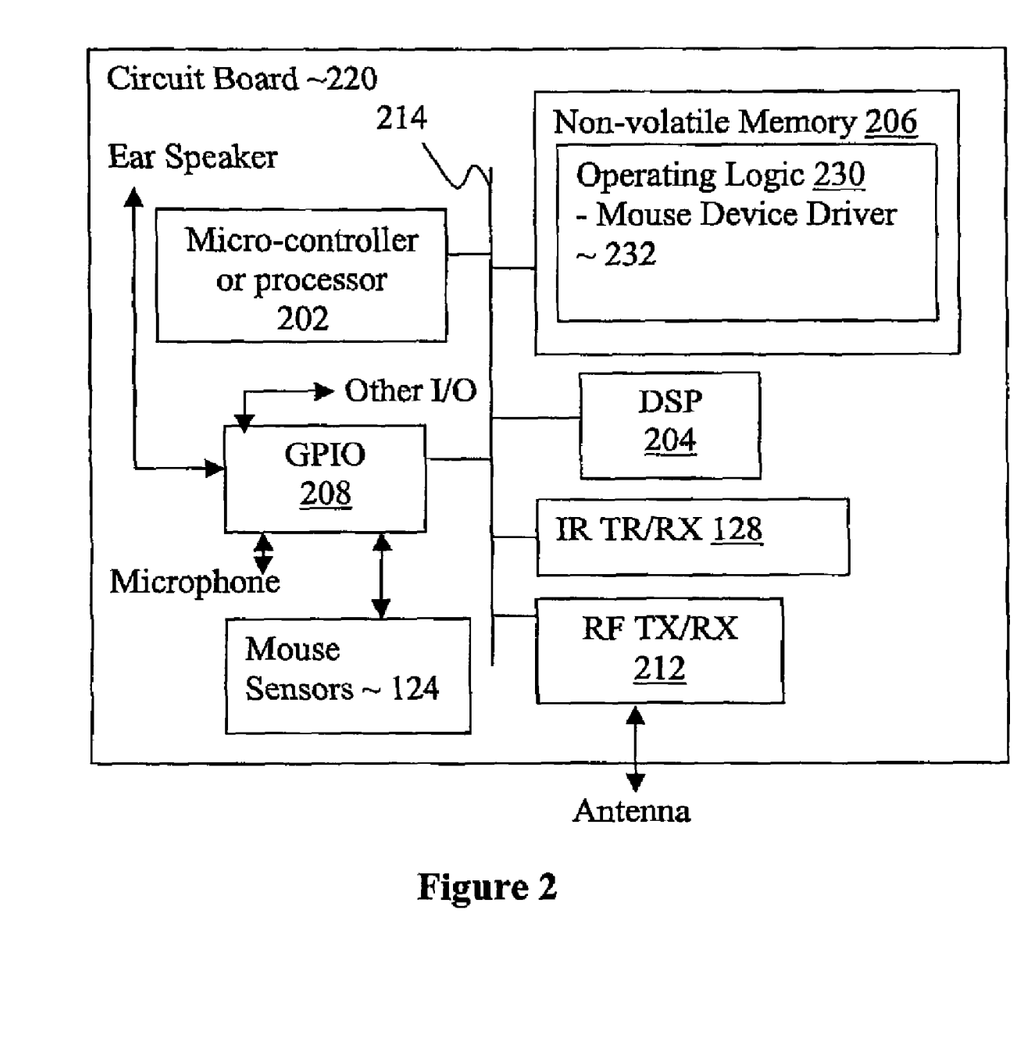
FIG. 2 illustrates an architectural view of the combined mobile communication plus point device, or more specially, the combined wireless mobile phone plus pointing device of FIG. 1, in accordance with one embodiment.

Referring now to FIGS. 1a-1b, and FIG. 2, wherein a front view, a side view, and an internal component (or architecture) view of a combined mobile communication plus pointing device, or more specifically, a combined wireless mobile phone plus pointing device 100, in accordance with one embodiment, is shown.

As illustrated, combined wireless mobile phone plus pointing device 100 includes a number of wireless mobile telephony elements 102-114, a number pointing control and selection elements 120 and 126a-126b, organized in a novel manner. Further, combined device 100 includes operating logic 230 having device driver 232. Device driver 232 facilitates integration of pointing control and selection elements 120 and 126a-126b into combined device 100, to allow combined device 100 to be able to selectively facilitate a user in communication with another party or to control pointing on a proximally disposed computing device.

More specifically, for the embodiment, combined device 100 having pointing control and selection elements 120 and 126a-126b integrated with telephony elements 102-114 enables combined device 100 to transmit/receive communication signals. Further, combined device 100 is enabled to transmit/receive pointing control and selection signals, to enable the user to control and interact with the proximally disposed computing device.

Resultantly, a mobile computing user having a need for mobile communication, and a preference to use to a separate mouse like pointing control device may do so with only two devices, i.e. the mobile computing device and the combined mobile communication plus pointing device of the present invention.

Note that as used herein, "communication" with the other party comprises verbal, e.g. a phone call, as well as, non-verbal, e.g. using text messaging. According, communication signals may include audio as well as non-audio signals, such as text messaging signals.

In various embodiments, both the communication signals and the pointing control and selection signals are transmitted and received as radio frequency signals. Typically, the communication signals are transmitted/received at higher radio frequencies and power levels, designed to reach base stations of a wireless network service provider at a further distance, whereas the pointing control and selection signals are transmitted/received at lower radio frequencies and power levels, designed to reach only a computing device that is proximally disposed "adjacent" to combined device 100.

However, in other embodiments, while the communication signals are transmitted as radio frequency signals, the pointing control and selection signals may be transmitted and received as infrared signals instead For the illustrated embodiment, pointing control and selection elements 120 and 126a-126b include movement mechanism 120 and selection buttons 126a-126b. More specifically, movement mechanism 120 includes roller 122 and a number of sensors 124. Further, roller 122 and sensors 124 are disposed in a "back" surface 118a of body 116 of combined device 100, with sensors 124 typically disposed orthogonal to each other.

Surface 118a is considered a "back" surface when combined device 100 is used for communication in a "hand held" position. Surface 118a may be considered a "bottom" surface, when combined device 100 is placed on a working surface and used to control pointing and selection on a proximally disposed computing device.

Together, roller 122 and sensors 124 enable a user to convey movement in one or more directions. In response, sensors 124 generate movement signals for the one or more directions, which in turn may be converted into pointing control signals, and transmitted to the proximally disposed computing device.

Selection buttons 126a-126b are employed to facilitate a user in conveying selection of a currently pointed at item on the proximally disposed computing device. Similarly, selection of a selection buttons 126a-126b results in the generation of selection signals for transmission to the proximally disposed computing device.

Wireless telephony elements 102-114 include audio communication elements such as ear speaker 112, and microphone 114, and non-audio communication elements, such as input key pad 102 having a number of alphanumeric input keys and display 108. Additionally, the non-audio input elements may further include scroll button 105, selection buttons 106, and "talk" and "end talk" buttons 104. "Talk" button 104 is also referred to as a "send" button. These elements are disposed on various external surfaces of body 116.

Externally, combined device 100 may also include antenna 110. Further, keys of key pad 102 may be surrounded by or otherwise include illuminable light emitting diodes (LED) in their background.

For the purpose of the present specification, the terms "button" and "key" may be considered synonymous, unless the context clearly indicates otherwise.

Internally, combined device 100 includes micro-controller/processor 202, digital signal processor (DSP) 204, non-volatile memory 206, general purpose input/output (GPIO)

interface 208, and transmit/receive (TX/RX) 128 and 212, coupled to each other via bus 214 and disposed on a circuit board 220.

Except for novel manner that many of these elements, such as processor 202, DSP 204 and so forth, are used in a dual manner to facilitate communication with another user as well as controlling pointing and selection on a proximally disposed computing device, the enumerated elements otherwise perform their conventional functions known in the art.

Non-volatile memory 206 is employed to store programming instructions and optionally, working data, including operating logic 230 with device driver 232. Working data may include callee/messaging party or parties (e.g. their phone numbers or IP addresses) with whom user may communicate. Working data may include movement data generated by movement mechanism 120 responsive to movements conveyed by a user.

Processor 202, assisted by DSP 204, is employed to operate combined device 100, executing operating logic 230, including device driver 232. Accordingly, processor 202, assisted by DSP 204, not only facilitates communication with another party, but also advantageously facilitates conversion of movement signals into pointing control signals, and transmission of the point control and selection signals.

In other words, by leverage on existing communication elements, the novel combined device 100 may be effectuated in a very efficient manner, with addition of only a relatively small number of movement and selection elements.

Keys of key pad 102 may be employed to enter alphanumeric data, including entering a sequence of alphanumeric data for the phone number or address of a "callee".

Scroll key 105 and companion selection keys 106 may be employed to scroll and select various options or list items of various menu options or selection lists, including scrolling and selecting list items presented for user interactions to verify the user's wellness. For the embodiment, scroll key 105 may be selected in one of two positions, an "up" position or a "down" position for scrolling a selection list in an "up" direction and a "down" direction respectively.

Note that selection keys 106 and selection keys 126a-126b differ in that the former selects items currently pointed at on combined device 100, whereas the latter selects items currently pointed at on the proximally disposed computing device.

GPIO 208 may be employed to generate input signals, such as a corresponding "alphanumeric" signal in response to a user selection of one of the keys of key pad 102, a "scroll" signal (or more specifically, a "scroll up" or a "scroll down" signals) in response to a user selection of scroll key 105, a "selection" signal in response to a user selection of select button 106, and so forth.

TX/RX 128 and 212 may be employed to transmit and receive communication signals for a call and/or a text message, as well as pointing control and selection signals. For communication signals, TX/RX 212 may be a radio frequency transceiver, and support one or more of any of the known signaling protocols, including but are not limited to CDMA, TDMA, GSM, and so forth. For pointing control signals, TX/RX 128 may be an infrared signal transceiver (as illustrated), or alternatively a radio frequency transceiver. In the latter case, TX/RX 128 and TX/RX 212 may be combined, as long as it support a frequency range that encompasses the frequency requirements of the communication signals and the frequency requirements of the pointing control and selection signals.

The operating ranges for TX/RX 128 and 212 for communication signals and pointing control signals are application dependent, and may vary from embodiment to embodiment.

The constitutions of these elements are known, and will not be further described. As to device driver 232, it may be implemented in the assembly or machine instructions of processor 202, or a high level language that can be compiled into these assembly or machine languages.

Accordingly, except for the enhancements provided, combined device 100 otherwise represents a broad range of wireless mobile phones, including both the analog as well as the digital types (of all signaling protocols), substantially rectangular uni-body as illustrated, or curved uni-body, as well as multi-portions, such as "flip phones" to be illustrated later.

Figure 3:
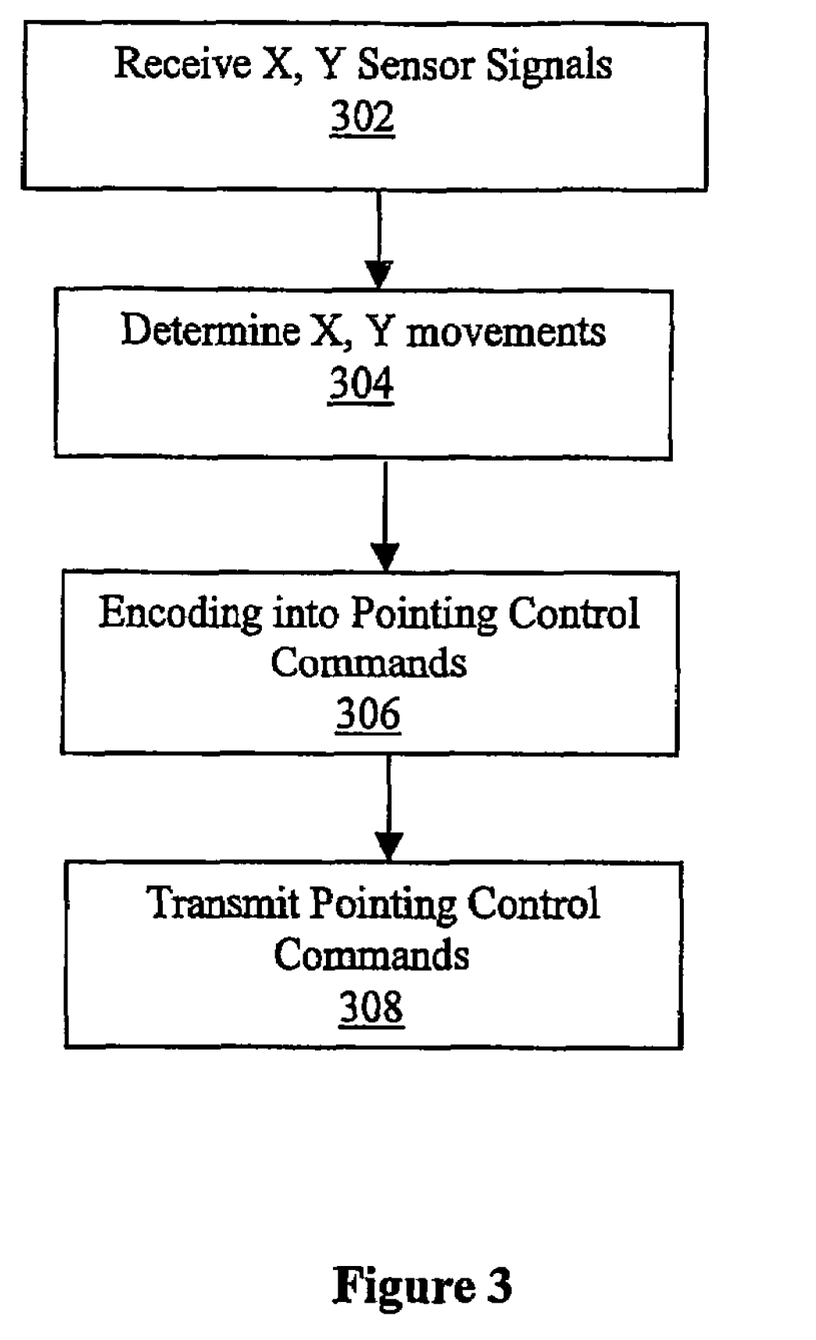
FIG. 3 illustrates the operational flow of the relevant aspects of the mouse device driver of FIG. 2, in accordance with one embodiment.

FIG. 3 illustrates the operational flow of the relevant aspects of mouse device driver 232, in accordance with one embodiment. As illustrated, on start up/reset, mouse device driver 232 monitors for movement signals. On detection of movement signals, block 302, device driver 232 determines movements for one or more directions, block 304. In one embodiment, device driver 232 determines movements for at least a X and a Y direction.

On determining the movements for the one or more directions, device driver 232 encodes the determined movements as pointing control commands, block 306, and causes the encoded pointing control commands to be transmitted as pointing control command signals to the proximally disposed computing device (using e.g. IR transceiver 128), block 308.

In alternate embodiments, the determined X and Y movements, without mapping into pointing control commands, may be sent instead.

Hereon after, including in the claims, the term "pointing control" signals comprise encoded pointing control command signals as well as movement signals.

Figure 4:
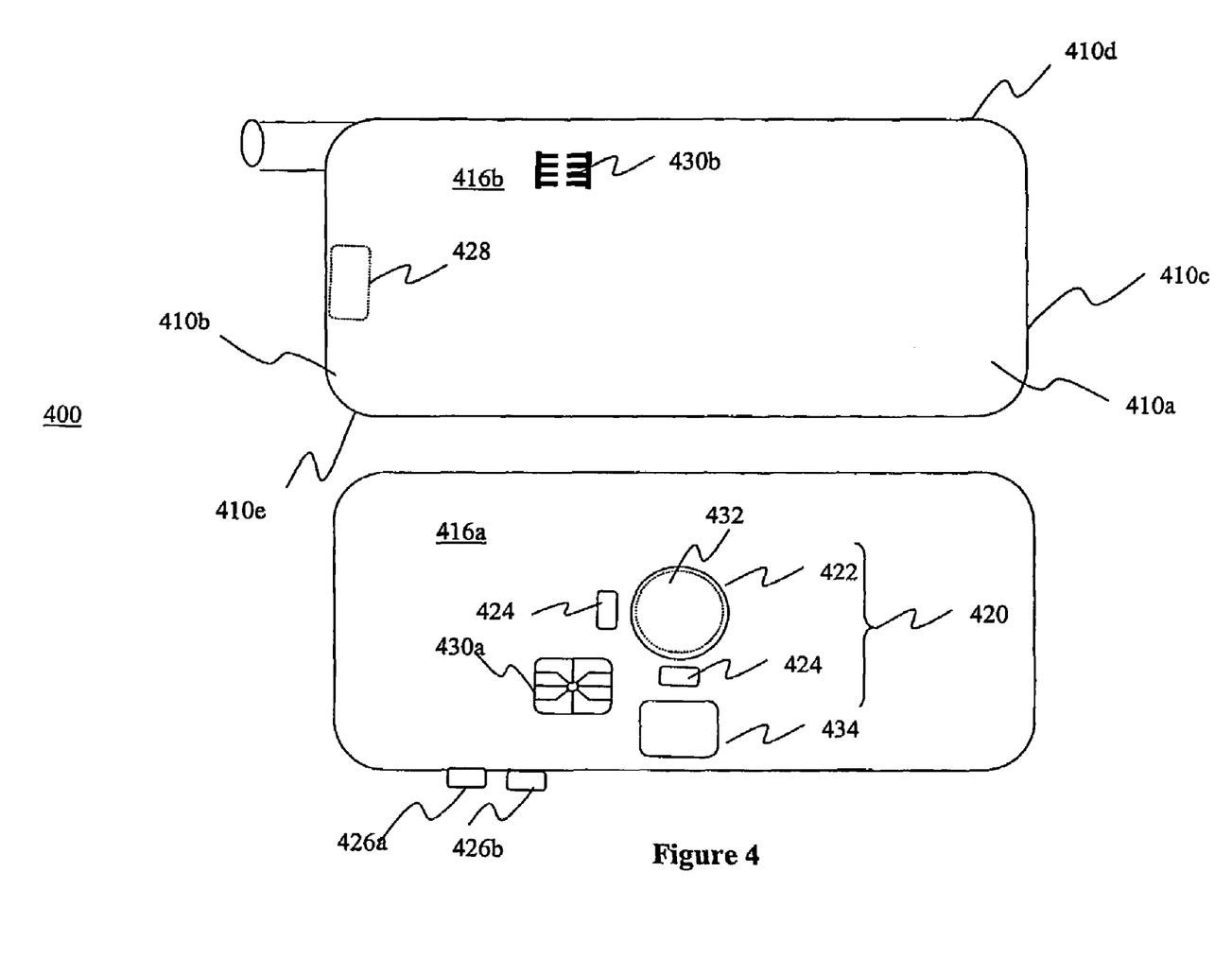
FIG. 4 illustrates an exposed view of the wireless mobile phone plus pointing device of FIG. 1, including a back view of an interchangeable cover where a portion of the teachings of the present invention are incorporated, in accordance with an alternate embodiment.

FIG. 4 illustrates an exposed view of a combined wireless phone plus pointing device 400, incorporated with the teachings of the present invention, in accordance with an alternate embodiment. For the embodiment, unlike the embodiment of FIG. 1, movement elements 422-424 of movement mechanism 420, are embedded in interchangeable cover 416a of combined device 400. Cover 416a is designed to mate with core unit 416b of combined device 400 covering front surface 410a and the side surfaces 410b-410e.

Cover 416a includes in particular cutout 432 for situating and exposing roller 422. Further, cover 416a includes interface 430a through which movement signals may be provided to processor 202 or DSP 204 for detection of movement in one or more directions, and transmission to the proximally disposed computing device (with or without conversion into pointing control commands).

In one embodiment, device driver 232, in performing the operations of FIG. 3, reads data buffers of interface 430a periodically to obtain and provide a processor similar to processor 202 or a DSP similar to DSP 204 with the movement signals.

For the illustrated embodiment, cover 416a also includes electronic component 434, within which all or portion of device driver 232 is embedded. In the case of partial embodiment of device driver 232, electronic component 434 may include data, such as a uniform resource locator (URL), identifying one or more remote locations from where the "remainder" of device driver 232 may be obtained. Of course, "remainder" may be the entire device driver 232.

That is, electronic component 434 includes only data such as a uniform resource locator (URL), identifying one or more remote locations from where the entire device driver 232 may be obtained.

Device driver 232 (in whole or in part) or data identifying the remote location(s) where device driver 232 is located (in whole or in part), may also be provided to via complementary interfaces or contacts 430a and 430b.

For the illustrated embodiment, cover 416a also includes selection buttons 426a-426b. Similarly, the selection signals generated by selection buttons 426a-426b may be provided to a processor similar to processor 202 via complementary interfaces or contacts 430a and 430b, for the processor to cause the selection signals to be transmitted to the proximally disposed computing device, e.g. through IR transceiver 428.

In other embodiments, only some of movement elements 422-424, electronic component 434 (with all or portion of device driver 232) and selection buttons 426a-426b, are disposed on interchangeable cover 410a, and not all elements.

Yet, in other embodiments, transceiver 428 may also be integrated with interchangeable cover 416a. For these embodiments, the pointing control and selection signals may also be provided to transceiver 428 through complementary interface and contact 430a and 430b. Similarly, for these embodiments, in performing the operations of FIG. 3, device driver 232 may provide these signals to transceiver 428 by writing to buffers of interface 430a.

Figure 5A:
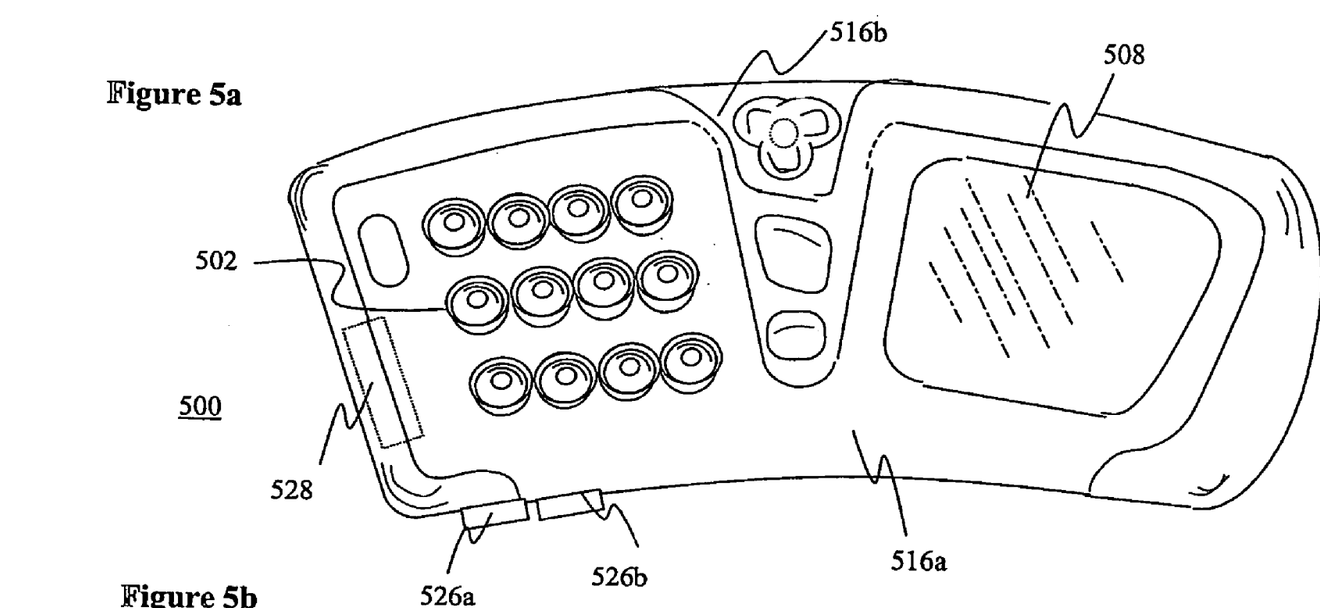
FIGS. 5a-5b illustrate another wireless mobile phone plus point device of the present invention, in accordance with another embodiment.
Figure 5B:
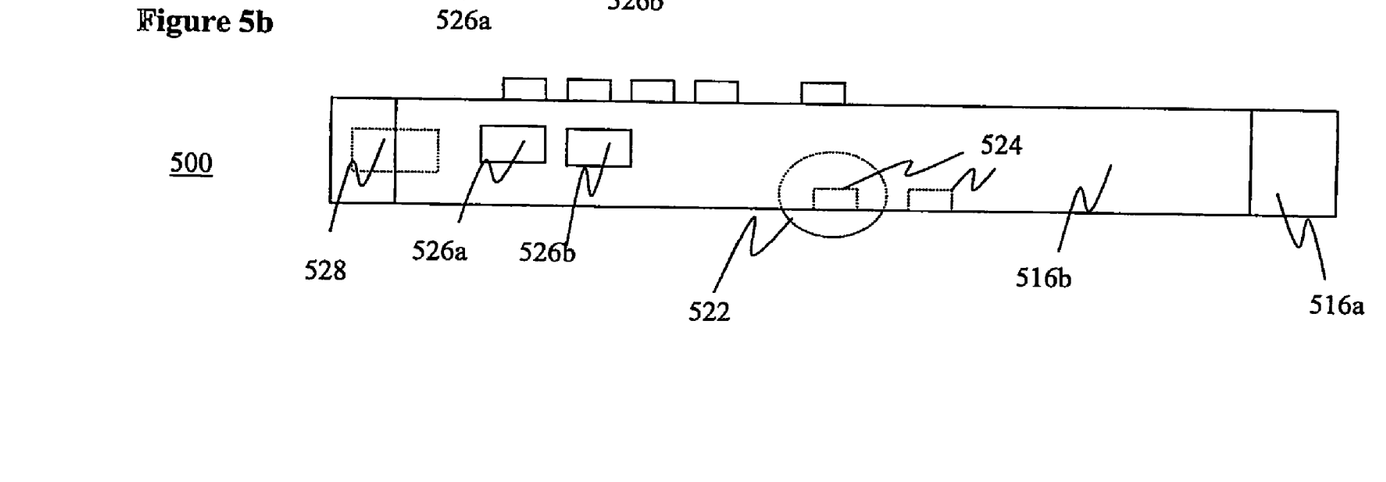

FIGS. 5a-5b illustrate yet another embodiment of the combined mobile communication plus pointing control device of the present invention. FIG. 5a illustrates a front view of the combined device, whereas FIG. 5b illustrates a side view of the combined device. The embodiment is substantially that of the embodiment of FIG. 1, except that combined device 100 is substantially rectangular, whereas combined device 500 has a curved shape. That is, movement elements 522-524 and selection buttons 526a-526b are integrated and disposed at the "back" and side surfaces of combined device 500 respectively.

Further, for combined device 100, input keys 102 are disposed "underneath" display 108, whereas for combined device 500, it is the opposite. That is, input keys 502 are disposed "above" display 508.

Note that since both input keys 102/502 and displays 108/508 have their natural orientations, i.e. the manner they are designed to be read, thus the "beneath"/"above' relative disposition is objectively determined.

Figure 6:
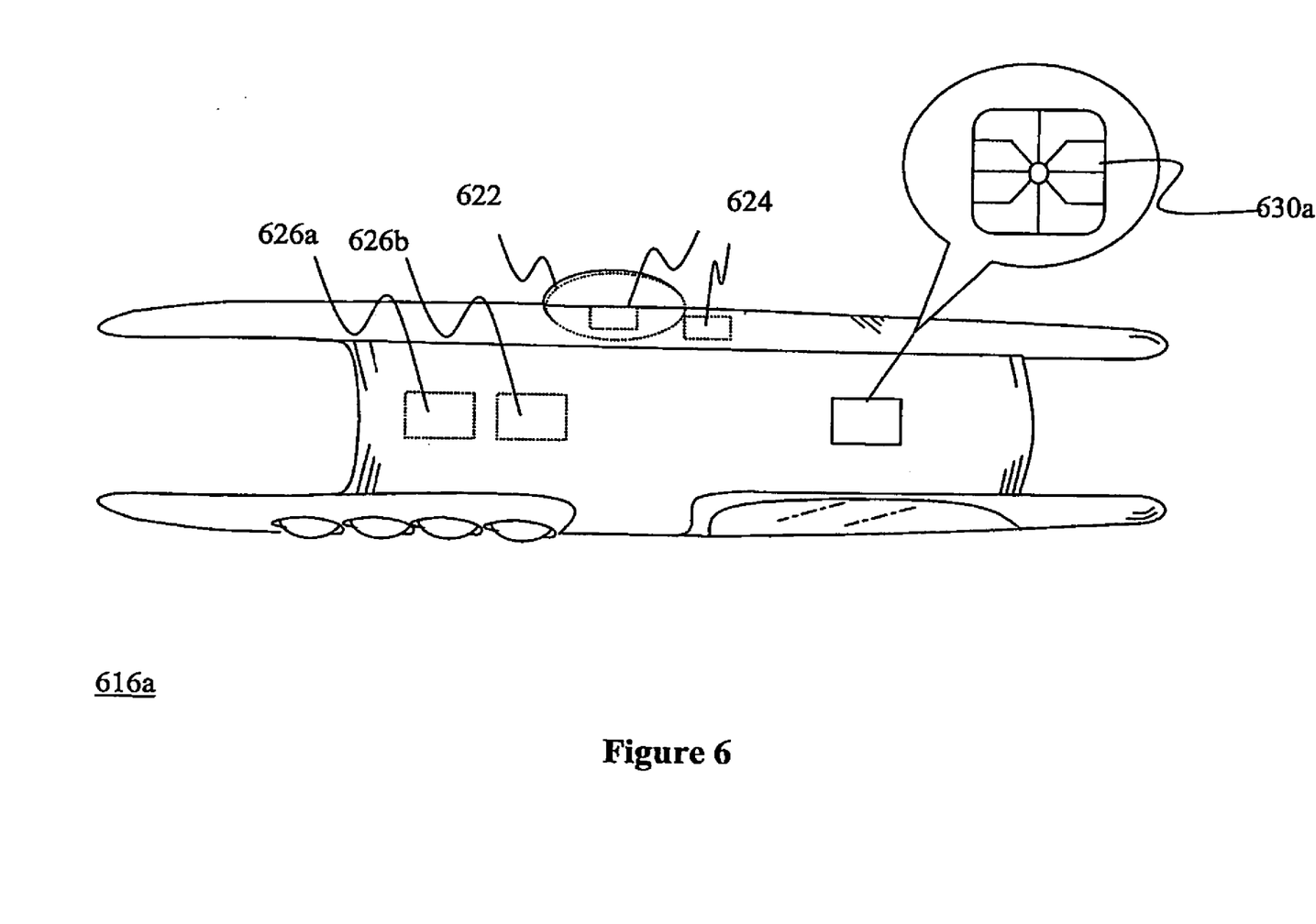
FIG. 6 illustrate an exposed view of an interchangeable cover of another variant of the wireless mobile phone plus pointing device of FIGS. 5a-5b, in accordance with another embodiment.

FIG. 6 illustrates an interchangeable cover for yet another alternate embodiment of the combined mobile communication plus pointing device of the present invention. The differences between the embodiment of the combined device to which the interchangeable cover of FIG. 6 is designed to attach, and the embodiment of FIGS. 5a-5b are substantially the same as the differences between the embodiment of FIG. 4 and the embodiment of FIG. 1. That is, both embodiments of the FIGS. 5a-5b and FIG. 6 have a curve shaped body. However, like the embodiment of FIG. 4, movement elements 622-624 and selection elements 626a-626b are disposed on interchangeable cover 616a, as opposed to fully integrated with the device.

Similar to the embodiment of FIG. 4, interchangeable cover 616a includes electronic component 634, having all or a portion of device driver 232 or data identifying one or more remote locations from where all or a portion of device driver 232 may be retrieved. Interchangeable cover 616a also includes interface 630a designed to mate with a complementary interface or contact disposed on a core body unit of the combined device, to facilitate exchange of data between the elements disposed within the core body and the elements disposed on interchangeable cover 616a.

In alternate embodiment, the transceiver may also be embedded with interchangeable cover 616a.

Figure 7A:
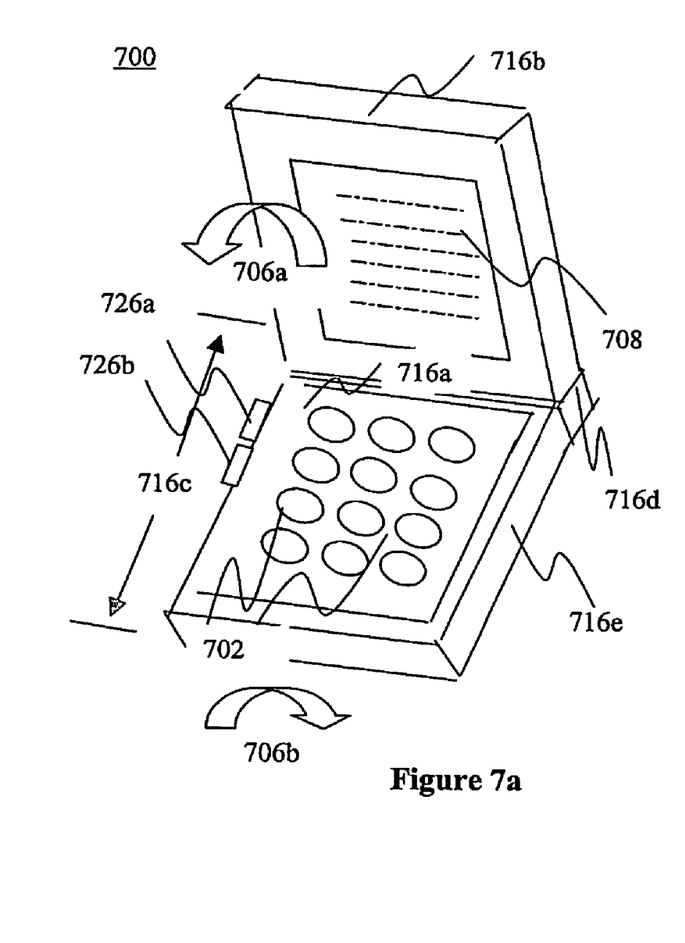
FIGS. 7a-7c illustrate another wireless mobile phone plus pointing device of the present invention, in accordance with yet another embodiment.
Figure 7B:
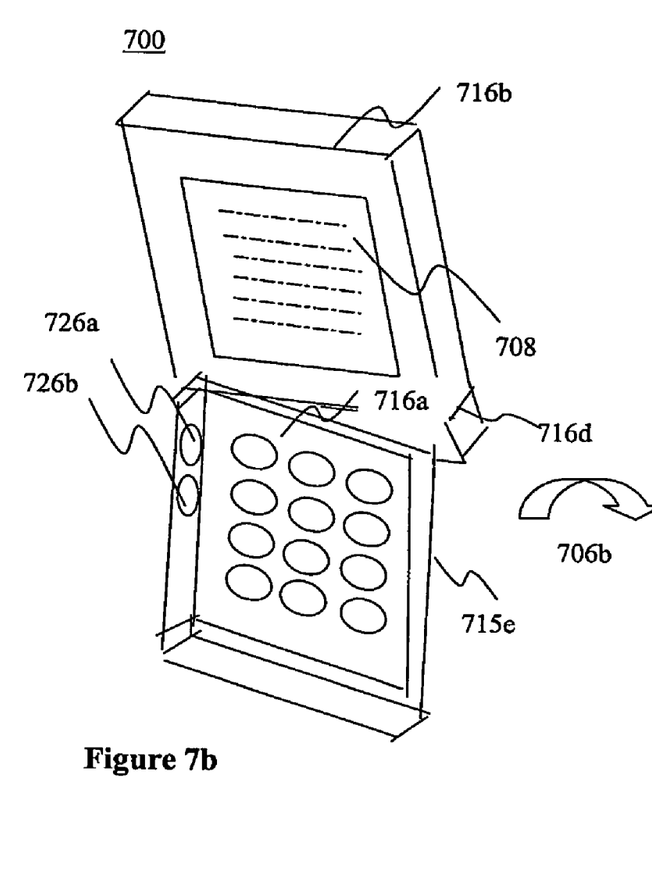
Figure 7C:
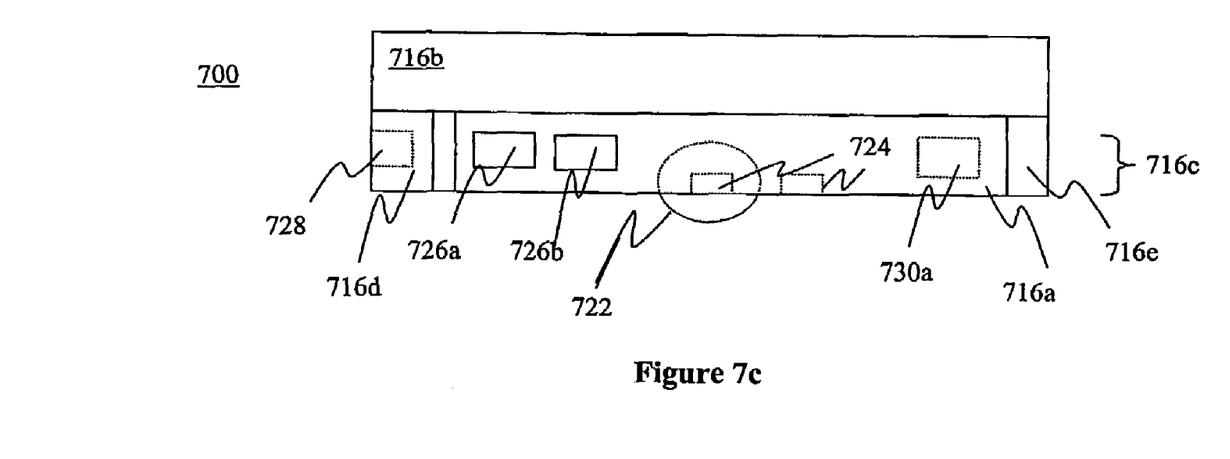

FIGS. 7a-7c illustrate yet another embodiment of the present invention. More specifically, FIGS. 7a-7b illustrate a perspective view of the combined device, whereas FIG. 7c illustrates a side view of the combined device. The embodiment is substantially that of the embodiments of FIGS. 1 and 5a-5b, except that combined device 100 is substantially rectangular, combined device 500 has a curve shaped body, whereas combined device 700 has a multi-section body. The multi-section form factor includes a first section 716b and a second section 716c, and the second section 716c is further comprised of at least two sub-sections 716d-716e. The first and second sections 716b-716c may pivot towards each other as denoted by direction arrow 706a or away from each other opposite to the direction denoted by arrow 706a. Sub-section 716d may rotate relative to sub-section 716e as denoted by the directions denoted by arrows 706b. In other words, combined device 700 may be considered as an improved version of what is commonly referred to as "flip" phones.

Similar to the earlier described embodiments, movement elements 722-724 and selection buttons 726a-726b are integrated and disposed at the "back" and side surfaces of combined device 700 respectively.

As before, combined device 700 also includes input keys 702 and display 708 disposed in the first section 716b and the second section 716c respectively, as shown. Internally, it includes components as those illustrated in FIG. 2, including in particular, a processor similar to processor 202, a DSP similar to DSP 204, and a transceiver similar to transceiver 128.

In alternate embodiments, movement elements 722-724 and/or selection elements 726a-726b may be integrated with interchanged cover 716a as the embodiment of FIG. 6. Interchangeable cover 716a covers multiple exterior surfaces of section 716c, disposed in different geometric planes.

For these embodiments, as earlier described, it may include an interface complementary to an expansion contact (not shown) disposed on section 716c to facilitate exchange of signals between the elements integrated with interchangeable cover 716a and core section 716c. Further, it may include an electronic component having all or a portion of device driver 232, or data identifying one or more remote locations where all or a portion of device driver 232 may be obtained.

Similarly, in these alternate embodiments, key pads 702 and display 708 may be disposed in the second section 716c and the first section 716b respectively instead.

Figure 8:
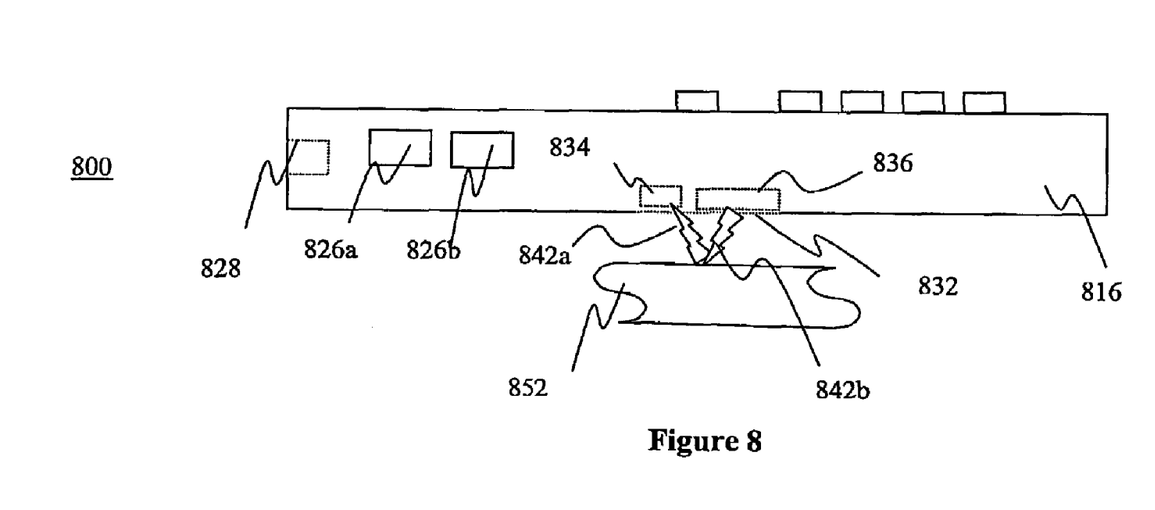
FIGS. 8-11 illustrate additional wireless mobile phone plus pointing devices of the present invention, in accordance with four other alternate embodiments.
Figure 9:
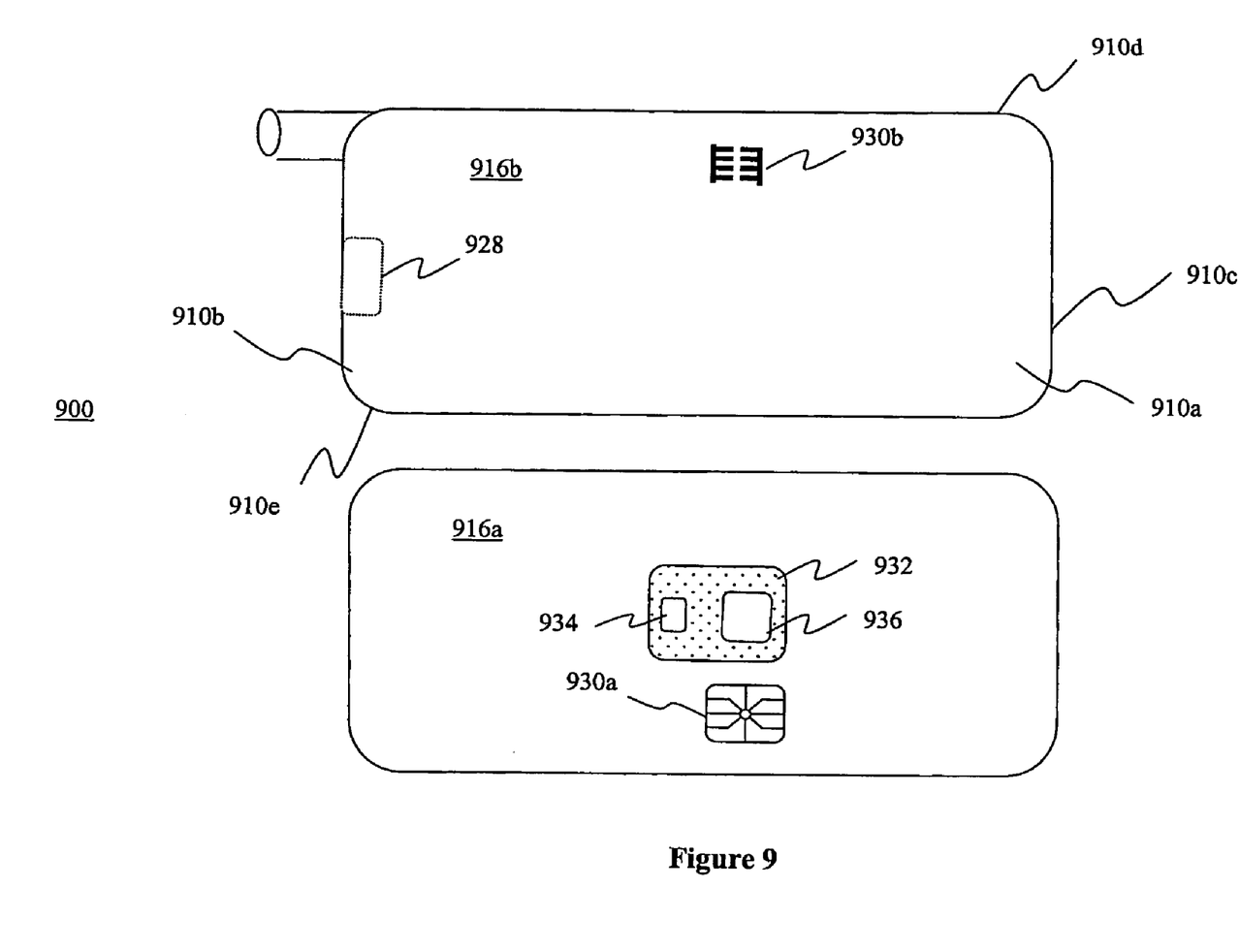

FIGS. 8 and 9 illustrate yet two other embodiments of the combined device of the present invention. Combined devices 800 and 900 are similar to that of the embodiments of FIGS. 1a-1b and FIG. 4 correspondingly, except that, instead of being substantially mechanical based, i.e. having roller element 122, movement mechanisms 820 and 920 are substantially optical based. Movement mechanism 820/920 includes light emitting diode (LED) 834/934, and photosensing array 836/936.

Internally, combined device 800/900 includes elements similar to those illustrated in FIG. 2, in particular, DSP 210. The body of combined device 800/900 includes transparent "window" 832/932 to allow light emitted from LED 834/934 to pass through to strike an outside external work surface, and reflect back to photo-sensing array 836/936. In response, photo-sensing array 8361936 outputs signals corresponding to the received reflections.

The reflection varies in accordance to the micro-structure of the external working surface. Accordingly, the reflection varies, as a user moves the combined device 800/900 to convey movements. In turn, the signals outputted by photo-sensing array 836/936 vary accordingly.

A DSP, similar to DSP 204, receives and analyzes the signals outputted by photo-sensing array 836/936 to determine movements in one or more directions as earlier described. The determined movements in the one or more directions are then encoded by a processor, similar to processor 202, as pointing control signals and transmitted to the proximally disposed computing device, using e.g. by an IR transceiver similar to IR transceiver 128.

Similarly, for the embodiment of FIG. 9, the transceiver (RF or IR) may also be integrated with interchangeable cover 916a.

Figure 10:
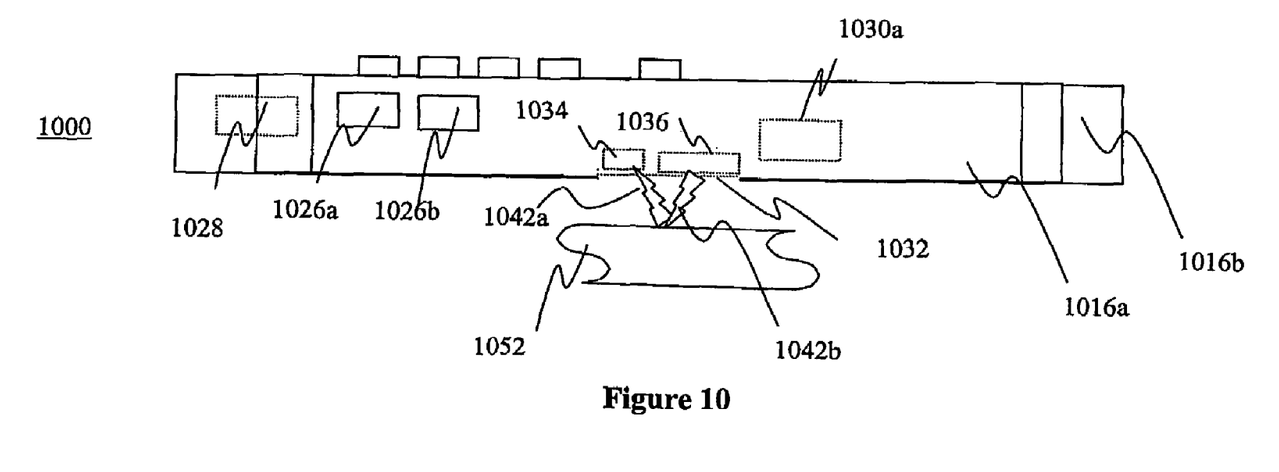
Figure 11:
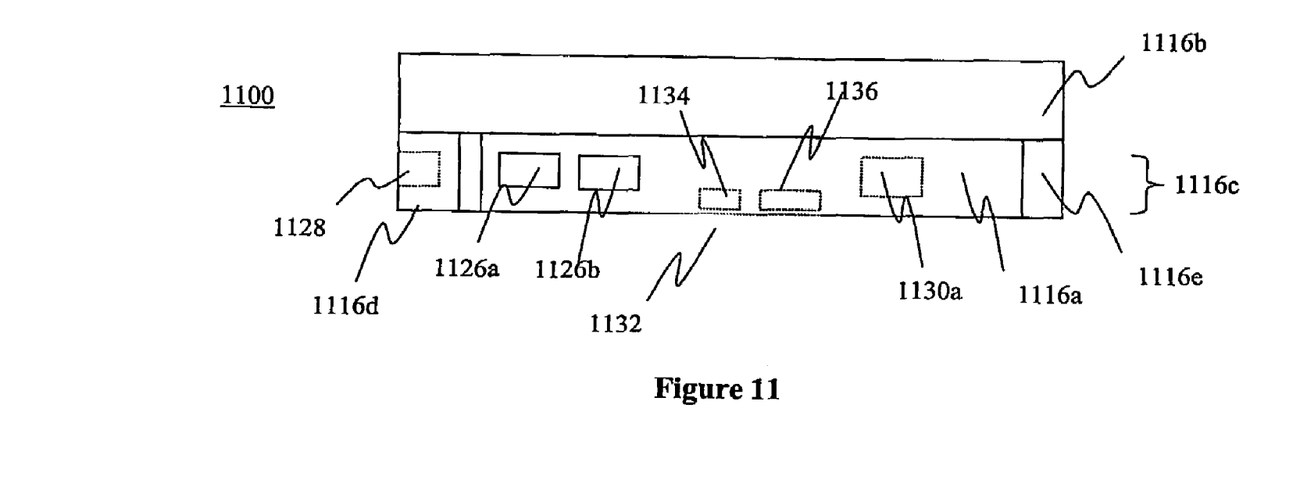

FIGS. 10 and 11 illustrate two other alternate embodiments of the combined mobile communication plus pointing device of the present invention. Combined devices 1000 and 1100 are similar to that of the embodiments of FIGS. 5a-5b and FIG. 7 correspondingly, except that, combined devices 1000 and 1100 differ from combined devices 500 and 700, as combined devices 800 and 900 differ from combined devices 100 and 400. That is, movement mechanism 1020/1120, instead of being substantially mechanical comprising a roller, comprises LED 1034/1134 and photo-sensing array 1036/1136 instead. The elements operate in conjunction with other elements, such as a DSP similar to DSP 204, a processor similar to processor 202, and transceiver 1028/1128 of combined devices 1000 and 1100 as earlier described.

Similarly, as combined device 400, LED 1034/1134 and photo-sensing array 1036/1136, complemented with complementary interfaces/contacts 1030a/1130a, may be integrated with interchangeable cover 1016a and 1116a instead. In these embodiments, as other earlier described embodiments of like kind, interchangeable cover 1016a and 1116a may also include selection buttons 1026a-1026b/1126a-1126b, an electronic component with all or a portion of device driver 232, or data identifying one or more remote locations from where all or a portion of device driver 232 may be retrieved, and/or transceiver 1028/1128.

ALTERNATE EMBODIMENTS

In alternate embodiments, the combined mobile communication plus pointing device may also include other additional elements, including but not limited to, a camera, a finger print reader, a heart beat profile collector, and/or control keys, such as the game control keys disclosed in the parent Ser. No. 10/301,431 application. The device driver of the game control keys may be further adapted to enable the game control keys to be selectively used to play games executing on the combined device, or on a proximally disposed computing device (e.g. the same device for which the integrated mouse is used as a cursor control pointing device). The game control signals may be communicated between the combined device and the proximally disposed computing device in the same or different manner, and/or same or different channels, as the pointing control signals are communicated between the devices.

CONCLUSION AND EPILOGUE

Thus, it can be seen from the above descriptions, a novel combined mobile communication plus pointing device has been described. While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A combined mobile communication plus pointing device comprising:
   one or more transceivers to transmit and receive communication signals in a first frequency at a first power level for a first distance, and pointing control signals in a second frequency at a second power level for a second distance, where the first and second frequencies, the first and second power levels, and the first and second distances are different from each other;
   communication input/output (I/O) mechanism to facilitate a user to communicate with another party;
   a movement mechanism to facilitate a user in conveying movements to control pointing on a computing device located proximally adjacent to said mobile communication plus pointing device; and
   a processor assembly, including storage medium and instructions stored therein, coupled to the one or more transceivers, the communication I/O mechanism, and the movement mechanism to integrate the one or more transceivers, the communication I/O mechanism and the movement mechanism to selectively facilitate the user in communicating with the other party and to control pointing on the proximally located computing device.

2. The device of claim 1, wherein both the communication and pointing signals are transmitted and received as radio frequency signals, and said one or more transceivers consist of a radio frequency transceiver equipped to transmit and receive in a frequency range and at a power range comprising the first and second frequencies and the first and second power levels respectively.

3. The device of claim 1, wherein both the communication and pointing signals are transmitted and received as radio frequency signals, and said one or more transceivers comprise a first and a second radio frequency transceiver equipped to transmit and receive in a first and a second frequency range and at a first and a second power range respectively, with the first frequency range comprising the first frequency, the second frequency range comprising the second frequency, the first power level range comprising the first power level, and the second power level range comprising the second power level.

4. The device of claim 1, wherein the communication and pointing signals are transmitted and received as radio frequency and infrared signals respectively, and said one or more transceivers comprise a radio frequency transceiver and an infrared transceiver equipped to transmit and receive radio frequency signals and infrared signals in a first frequency range at a first power level and a second frequency range at a second power range respectively, with the first frequency range comprising the first frequency, the first power level range comprising the first power level, the second frequency range comprising the second frequency, and the second power level range comprising the second power level.

5. The device of claim 1, wherein said movement mechanism comprises a electro-mechanical mechanism including a roller and one or more electro-mechanical sensors to sense movements of the roller in one or more directions, and generates in response, movement signals in the one or more directions.

6. The device of claim 1, wherein said movement mechanism comprises an optical-electro-mechanical mechanism including a roller, a light emitting diode (LED) to emit light, one or more diffusers coupled to the roller to diffuse the light emitted from the LED in one or more directions, responsive to movement of the roller, and one or more optical-electro signal generators correspondingly aligned with the one or more diffusers to sense the diffused light and generate in response, movement signals in the corresponding one or more directions.

7. The device of claim 1, wherein said movement mechanism comprises a light source to emit light, and an array of light sensors to sense the emitted light reflecting off an external surface to facilitate generation of movement signals in one or more directions.

8. The device of claim 1, wherein the movement mechanism comprises a roller, with the roller being disposed on a back/bottom surface of the device, the back/bottom surface being a back surface when the device is used for communication and a selected one of a back and a bottom surface when the device is used for pointing control, depending on whether the device is used not in conjunction or in conjunction with a surface of another object.

9. The device of claim 1, wherein the movement mechanism comprises a roller, with the roller being disposed on a side surface of the device.

10. The device of claim 1, wherein the device further comprises a body housing at least said one or more transceivers, and said processor assembly, and an interchangeable cover that is removably mated with the body, the interchangeable cover housing at least the movement mechanism, with the body and the interchangeable cover further comprising complementary interfaces to provide movement signals generated by the moving mechanism to the processor assembly.

11. The device of claim 1, wherein the device further comprises one or more select buttons, disposed on a selected one of a first side surface and a front surface of the device, to facilitate the user in conveying selections to the proximally disposed computing device.

12. The device of claim 11, wherein the one or more select buttons are disposed on a first side surface, and the movement mechanism comprises a roller, with the roller being disposed on a second side surface of the device, the first and second side surfaces being different complementary side surfaces.

13. The device of claim 1, wherein the device further comprise a digital signal processor coupled to the processor to assist the processor in processing of the communication and movement signals received, and generation of the communication and pointing control signals to be transmitted.

14. The device of claim 1, wherein the device further comprises one or more game control keys, and the instructions are further designed to integrate the one or more game control keys with the one or more transceivers, the communication I/O mechanism and the movement mechanism, and to facilitate usage of the one or more control keys to control a game on the proximally located computing device.

* * * * *